Nov. 25, 1947.   W. C. EYLES   2,431,469
APPARATUS FOR SAWING ORNAMENTAL STONES
Filed Jan. 28, 1946   3 Sheets-Sheet 1

INVENTOR.
W. C. Eyles
BY
ATTORNEYS.

W. C. Eyles
INVENTOR.

BY CA Snow Co.
ATTORNEYS.

Patented Nov. 25, 1947

2,431,469

UNITED STATES PATENT OFFICE 2,431,469

APPARATUS FOR SAWING ORNAMENTAL STONES

Wilfred C. Eyles, Bayfield, Colo.

Application January 28, 1946, Serial No. 643,873

5 Claims. (Cl. 125—13)

This invention relates to an apparatus for sawing ornamental stones, glass, bricks, tiles, and many other similar materials.

An object of the invention is the provision of an apparatus for sawing various crystalline and other hard materials with a diamond saw blade in which the materials are held by a pair of jaws movable toward each other for clamping the materials in place, said jaws being slidable on sleeves mounted on guide rods for eliminating strain or stress when the jaws are holding uneven materials so that the jaws may freely slide on the rods.

Another object of the invention is the provision of an apparatus for sawing various crystalline and other hard materials with a diamond saw blade in which a pair of clamping jaws for the materials are so supported and coordinated that said jaws may be moved longitudinally toward or away from each other over the surface of a saw-cleaning fluid in a housing or as a unit for operatively positioning the material relatively to the saw when said jaws have been moved longitudinally into gripping relation with the material.

A further object of the invention is the provision of an apparatus for sawing various crystalline and other hard materials with a diamond saw blade mounted in a housing containing a saw-cleansing solution, the upper open end of the housing having an inturned peripheral flange to prevent the solution from splashing over the edge, a slidably mounted material-clamping device located over the solution and movable adjacent a table which will collect waste matter and pieces cut from the material.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

In the accompanying drawings the preferred form of the invention has been shown.

Referring more particularly to the drawings, 10 designates generally a housing formed of any suitable material and the housing has an open upper end. A table 11 extends laterally from one side wall of the housing and has an upturned lip 12 for a purpose which will be presently explained. It will be noted that the other side wall and the two end walls also have an upturned lip or flange 13. A brace 14 is connected to the side wall 15 of the housing and to the under face of the table 11 for aiding in supporting said table.

Figure 1:
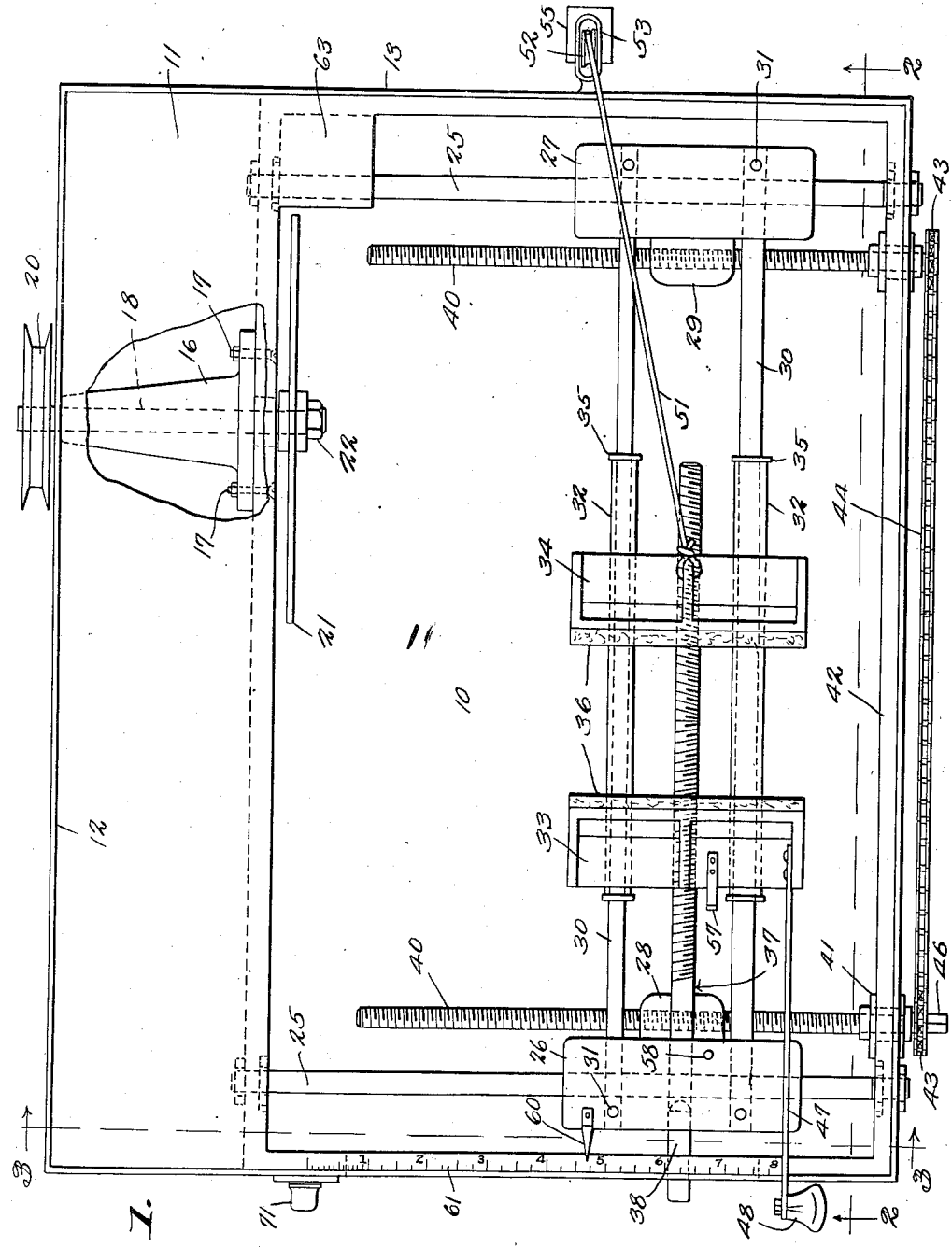
Figure 1 is a plan view of an apparatus for sawing ornamental stones and other similar materials with the protective cover removed.

An inspection of Fig. 1 will show that a bearing 16 is bolted at 17 to the side wall 15 and this bearing supports a shaft 18 which projects through the side wall 15 above the level of a liquid 19 in the housing 10. A pulley 20 is secured to the outer end of the shaft 18 beyond the outer edge of the table 11. A saw 21 is secured to the shaft 18 by a nut 22 at the inner end of the shaft so that the lower portion of the saw will be mersed in the liquid or solution 19. The pulley 20 is driven by a belt connected with a power plant so that the saw 21 will be revolved in the housing.

The diamond saw blade 21 is circular and is adapted to saw such rock specimens as ornamental stone, ceramic, glass, semi-precious materials such as agate, jasper, petrified wood, and many other non-metallic materials.

A carriage is provided for supporting the materials to be sawed and this carriage is mounted for reciprocation longitudinally of the tank or housing 10 and is adapted to be moved transversely of the tank for positioning the materials which are to be cut, in line with the circular saw 21. The carriage is mounted on a pair of guide bars 25 which have their ends secured in the opposite side walls of the tank 10 and adjacent the end walls of said tank. A block 26 is slidably mounted on one guide bar 25 while a block 27 is slidably mounted on the other guide bar. The block 26 is provided with an extension 28 while the block 27 is provided with an extension 29. A pair of rods 30 have their ends received by passages in the blocks 26 and 27 adjacent the end walls of the tank and set screws 31 secure these rods to the blocks so that the rods 30 and the blocks form a carriage which is movable transversely of the tank 10.

A sleeve 32 is slidably mounted on each rod 30 and these sleeves are received by passages in jaws 33 and 34 so that these jaws are slidable on the sleeves with the sleeves being slidable on the rod 30. The opposite ends of the sleeves 32 are provided with flanges 35 to prevent the jaws from being displaced from said sleeves. The jaws 33 and 34 are provided with a coating of leather 36 so that the material which is gripped between the two jaws will not be broken since the jaws are formed of metal.

An operating rod 37 has a squared portion 38 projecting through an opening in an end wall of the tank 10. The portion of the rod which is located within the tank is threaded into passages in the lower portion of the jaws 33 and 34. As shown in Fig. 1 one portion of the threads are left hand while the other portion contains right hand threads so that as the rod 37 is operated by a crank 39 the jaws 33 and 34 will be moved toward or away from each other depending upon the rotation of said rod for gripping or releasing the work to be operated on.

A threaded rod 40 is received by a threaded passage in each of the extensions 28 and 29, the outer ends of these rods as shown in Fig. 1 are mounted in bearings 41 in a side wall 42 of the tank 10. These threaded rods project through said side wall and a sprocket 43 is secured on each projecting end. A chain 44 is trained over the sprocket. A crank 45 is adaptably connected to the squared end 46 on one of the rods 40 for rotating both rods simultaneously through the chain and the sprockets. When this happens the carriage supporting the jaws 33 and 34 are moved transversely of the tank 10 and these jaws will then position the work in line with the cutting edge of the circular saw 21.

Figure 2:
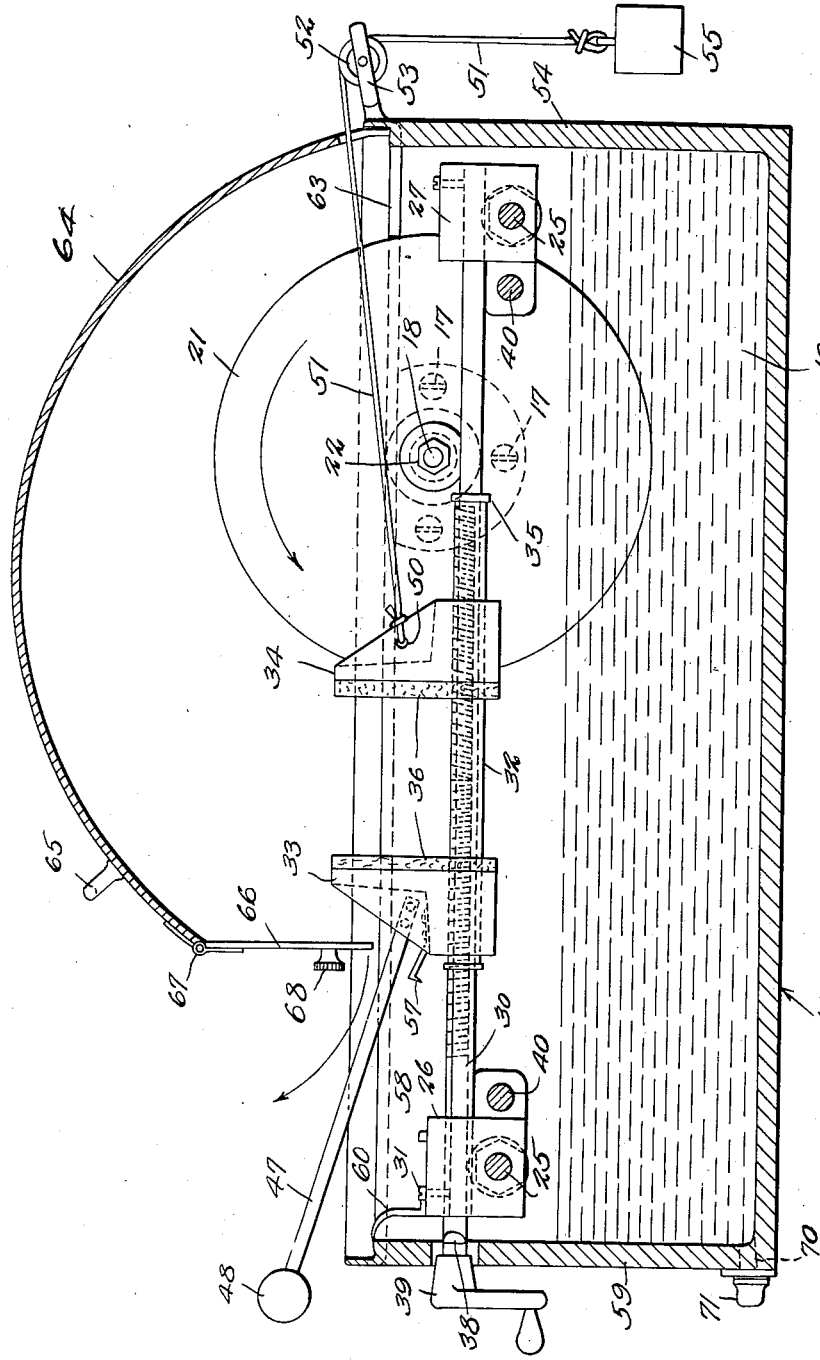
Figure 2 is a longitudinal vertical section taken along the line 2—2, Fig. 1.
Figure 3:
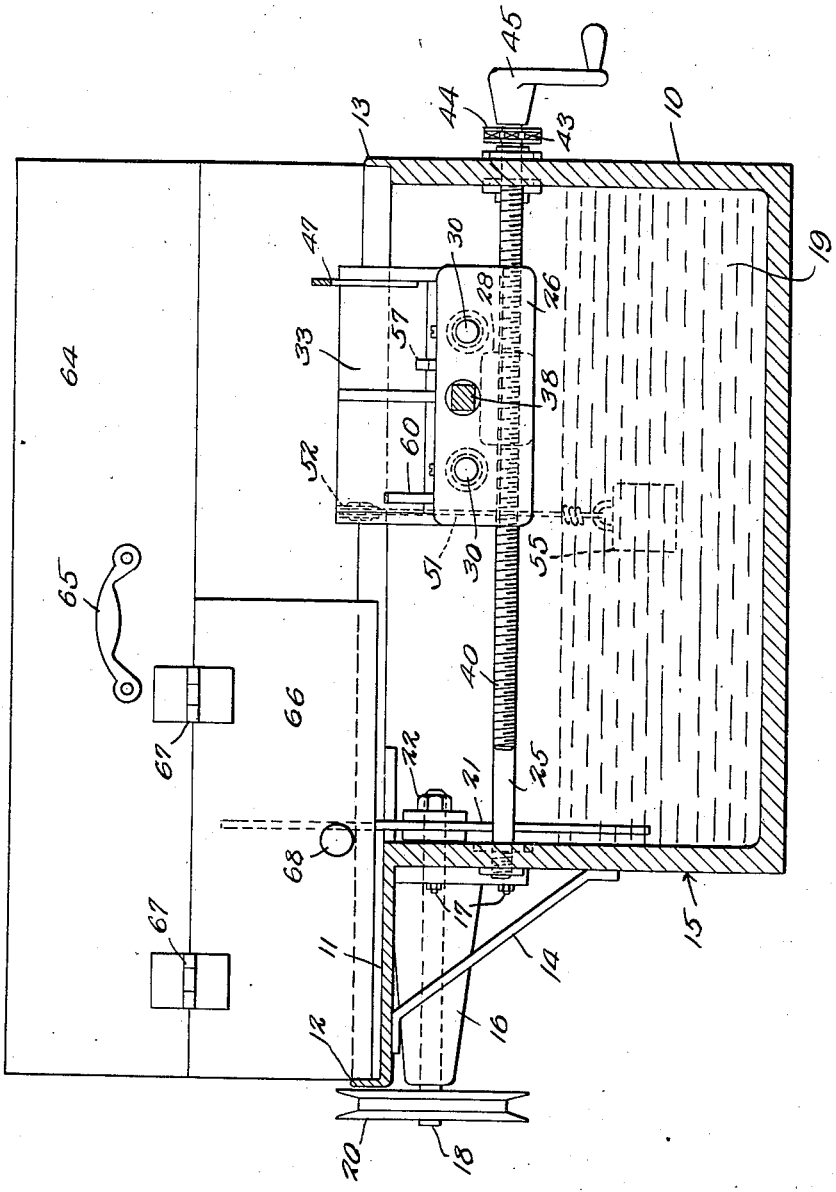
Figure 3 is a transverse vertical section of the apparatus taken along the line 3—3, Fig. 1.

An arm 47 projects rearwardly of the jaw 33 as shown in Fig. 2 and is provided with a hand grip 48 in order to move the jaw back and forth when desired. The jaw 34 is provided with a passage 50 which receives one end of a cable 51. This cable is trained over a pulley 52 carried by a bracket 53 projecting from an end wall 54 of the tank 10. A weight 55 is secured to the free end of the cable 51. Since the jaws 33 and 34, when gripping a piece of work to be cut, are free to slide along the rods 30 as a unit, the weight 55 will pull the jaws toward the periphery of the revolving saw 21 and maintain the work in contact with said saw. This eliminates the necessity of having an operator in constant attendance during the sawing operation.

A spring clip 57 is secured to the jaw 33 as shown in Figs. 1 and 2, and the end of this clip is adapted to engage a pin 58 projecting upwardly from the block 26 for maintaining the jaws adjacent the end wall 59 of the tank 10 and out of operative relation with the saw 21.

A pointer 60 is secured to the top of the block 26 and this pointer moves over a scale 61 on the upper end of the end wall 59. As the carriage is shifted transversely of the tank 10 and towards the saw 21, the pointer 60 will indicate on the scale 61 the degree of thickness of the slicing desired.

A baffle 63 is located near the periphery of the circular saw 21 to prevent liquid being splashed from the tank. The flanges 12 and 13 aid in preventing the liquid from splashing over the upper edges of said tank. The cover 64 is mounted on the top of the tank to protect the operator from injury from the revolving mechanism of the saw. A handle 65 is employed for raising the cover 64. A door 66 is hinged at 67 on the front end of the cover and is provided with a knob 68 for raising the door so that the operator may view the work during operation without necessitating the raising of the cover.

The wall 59 is provided with an opening 70 through which the liquid or solution 19 in the container 10 is drained. A plug 71 normally closes said opening.

The operation of the device is as follows.

The tank 10 is partially filled with a cleansing or flushing solution in order to prevent the saw from clogging. This solution is usually kerosene with motor oil added, but in the case of sawing glass or quartz crystal the solution may be water in which is dissolved soda to prevent rusting. It will be noted from Fig. 2 that the lower end of the saw 21 dips into the solution and below the shaft 18. The carriage including the clamp elements 33 and 34 together with the transverse guide rods 25 and the operating screws 40 are also above the level of the liquid.

The cooperating jaws 33 and 34 are moved as a unit on the sleeves 32 toward the end wall 59 of the tank so that the spring clip 57 will engage the pin 58 to retain the jaws in position.

The material to be sawed is placed between the jaws 33 and 34 and between the leather facings of said jaws. The rod 37 is then rotated by the crank 39 until the jaws firmly clamp the work between the facings 36.

The crank 45 is then revolved in the proper direction so that the carriage containing jaws 33 and 34 is moved transversely of the tank until the pointer 60 indicates the proper cut on the scale 61. The saw 21 is then revolved after which the spring clip 57 is released from the pin 58 whence the weight 55 will move the jaws and work clamped therebetween to the cutting edge of the saw and will maintain the work in contact with the saw until the sawing operation has been completed.

The lower edges of the clamps 33 and 34 are so formed that they will clear the inner end of the shaft 18 together with the nut 22 so that the saw can come close to the adjacent ends of said jaws.

What is claimed is:

1. A device for sawing material comprising a housing, spaced guide rods mounted longitudinally in the housing, transverse spaced guide rods mounted in the housing in a plane below the longitudinal rods, a block secured to each group of the adjacent ends of the longitudinal rods, each block having a passing to receive a transverse rod so that the longitudinal rods may be moved as a unit toward one side of the housing, a sleeve neatly received by each longitudinal rod, a pair of jaws, each having passages neatly receiving the sleeves, means causing the jaws to move toward each other for gripping a piece of material to be cut, a revolving saw for cutting the material adjacent the first mentioned side of the housing, means moving the longitudinal rods and jaws toward said side of the housing and means causing the jaws to slide as a unit on the sleeves for moving the material into cutting relation with the saw.

2. An apparatus for sawing materials comprising a housing, a revoluble saw mounted on one side wall of the housing and within said housing, a carriage longitudinally disposed in the housing, means slidably mounting the carriage in said housing, a pair of clamping jaws slidable on the carriage, means on the carriage for causing the jaws to be moved into clamping relation with a piece of material to be cut, means for positioning the carriage so that the jaws will aline the material with the cutting edge of the saw, and means causing the jaws to move the material into the saw, said housing adapted to be filled sufficiently with a saw-cleaning fluid so that the lower portion of the saw will be immersed in the liquid.

3. In an apparatus for sawing frangible materials, means for supporting and moving the materials into a saw comprising a housing, a pair of longitudinal rods in the housing, a block secured to each of the pair of adjacent ends of the rods, a screw threaded into a passage in each block, means rotating the screws simultaneously for causing the rods as a unit to move transversely of the housing, a clamping device for material to be cut slidable on the rods, means causing the clamping device to grip the material, a circular saw mounted in the housing, and means causing the clamping device to move the material into cutting relation with the saw.

4. A device for sawing non-metallic materials comprising a housing adapted to be partially filled with a saw-cleaning solution, a circular saw mounted in the housing and projecting into the solution, a carriage slidable longitudinally of the housing, said carriage additionally slidable transversely of the housing, a pair of clamping jaws slidable on the carriage, means for sliding said jaws toward each other into clamping relation with a piece of material to be cut, and means causing the jaws to carry the material into operative relation with the saw.

5. A device for sawing non-metallic materials comprising a housing adapted to be partially filled with a saw-cleaning solution, a circular saw mounted in the housing and projecting into the solution, a carriage mounted in the housing, comprising spaced rods mounted longitudinally of the housing, and a clamping device slidable as a unit along said rods, said clamping device including a pair of jaws slidable toward each other for gripping a piece of material to be cut, said carriage being slidable as a unit transversely of the housing, so as align the engaged material with the cutting edge of the saw, means causing the jaws to carry the material into operative relation with the saw, means for revolving the saw.

WILFRED C. EYLES.

REFERENCES CITED

The following references are of record in the file of this patent:

UNITED STATES PATENTS

| Number | Name | Date |
| --- | --- | --- |
| 1,824,000 | Walter | Sept. 22, 1931 |
| 2,063,236 | Eisler | Dec. 8, 1936 |
| 2,382,257 | Ramsay | Aug. 14, 1945 |